United States Patent
Lee et al.

(10) Patent No.: US 10,525,811 B2
(45) Date of Patent: Jan. 7, 2020

(54) PARTS ARRANGEMENT STRUCTURE OF FUEL CELL ELECTRIC VEHICLE

(71) Applicants: Hyundai Motor Company, Seoul (KR); Kia Motors Corporation, Seoul (KR)

(72) Inventors: Hei Chang Lee, Gyeonggi-do (KR); Sang Chul Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/179,901

(22) Filed: Nov. 3, 2018

(65) Prior Publication Data

US 2019/0375282 A1 Dec. 12, 2019

(30) Foreign Application Priority Data

Jun. 12, 2018 (KR) .................. 10-2018-0067130

(51) Int. Cl.
| | | |
|---|---|---|
| *B60K 1/04* | (2019.01) | |
| *B60K 15/063* | (2006.01) | |
| *H01M 8/04858* | (2016.01) | |
| *H01M 8/04119* | (2016.01) | |

(52) U.S. Cl.
CPC .............. *B60K 1/04* (2013.01); *B60K 15/063* (2013.01); *H01M 8/04126* (2013.01); *H01M 8/04858* (2013.01); *H01M 2250/20* (2013.01)

(58) Field of Classification Search
CPC ... B60K 1/04; B60K 2001/0405–0411; H01M 8/04126; H01M 8/04858; H01M 2250/20
See application file for complete search history.

(56) References Cited

U.S. PATENT DOCUMENTS

| | | | |
|---|---|---|---|
| 2005/0224265 A1* | 10/2005 | Mizuno ..................... | B60K 1/02 429/413 |
| 2005/0230164 A1* | 10/2005 | Uozumi ..................... | B60K 1/04 180/89.1 |
| 2006/0280977 A1* | 12/2006 | Sakajo .............. | H01M 8/04007 429/429 |
| 2014/0110185 A1* | 4/2014 | Naito ..................... | B60L 3/0007 180/65.31 |
| 2015/0027796 A1* | 1/2015 | Naito ....................... | B60K 1/04 180/65.31 |
| 2015/0244006 A1* | 8/2015 | Yoshitomi ........... | H01M 8/2475 429/446 |
| 2017/0101031 A1* | 4/2017 | Ohashi ..................... | B60L 50/71 |
| 2017/0179504 A1* | 6/2017 | Honda .............. | H01M 8/04007 |
| 2017/0244122 A1* | 8/2017 | Hamachi ........... | H01M 8/04302 |
| 2018/0034087 A1* | 2/2018 | Watanabe ......... | H01M 8/04014 |

FOREIGN PATENT DOCUMENTS

| | | |
|---|---|---|
| JP | 2017-168241 A | 9/2017 |
| KR | 2008-0055080 A | 6/2008 |
| KR | 2008-0056335 A | 6/2008 |
| KR | 2009-0050117 A | 5/2009 |
| KR | 2009-0062326 A | 6/2009 |

* cited by examiner

*Primary Examiner* — Erez Gurari
(74) *Attorney, Agent, or Firm* — Mintz Levin Cohn Ferris Glovsky and Popeo, P.C.; Peter F. Corless (57) ABSTRACT

A parts arrangement structure of a fuel cell electric vehicle (FCEV) is provided. The structure improves ease of assembly and maintenance of parts, by efficiently arranging and modularizing a fuel cell system, a drive device, and some of electric parts, which are installed within the FCEV.

11 Claims, 8 Drawing Sheets

PARTS ARRANGEMENT STRUCTURE OF FUEL CELL ELECTRIC VEHICLE

CROSS-REFERENCE TO RELATED APPLICATION

This application claims under 35 U.S.C. § 119(a) the benefit of priority to Korean Patent Application No. 10-2018-0067130 filed on Jun. 12, 2018, the entire contents of which are incorporated herein by reference.

BACKGROUND

(a) Technical Field

The present disclosure relates to a parts arrangement structure of a fuel cell electric vehicle, and more particularly, a parts arrangement structure of a fuel cell electric vehicle that improves performance such as ability to be assembled, ability to be maintained, crashworthiness, noise vibration harshness (NVH), cooling for the electric parts and the like by efficiently arranging and modularizing a fuel cell system, a drive device, and electric parts, installed within the fuel cell electric vehicle.

(b) Background Art

A fuel cell electric vehicle (FCEV) is a type of electric vehicle which operates with a drive motor by installing a fuel cell as a power source, which generates electricity using hydrogen and oxygen as fuel. A fuel cell system is installed within the FCEV to allow a drive motor to operate the FCEV using electric power generated by the fuel cell, and for the purpose of vehicle operation, the drive motor and the fuel cell system are disposed at suitable positions.

However, when parts of the fuel cell system and the drive motor are installed within the FCEV, an available vehicle space is limited, and there is a limitation in arranging all the parts of the fuel cell system at optimal positions, thus decreasing the ability to assembly, maintain, or performance securement of the parts according to installation positions of the parts and an arrangement state between the parts.

The above information disclosed in this section is merely for enhancement of understanding of the background of the invention and therefore it may contain information that does not form the prior art that is already known in this country to a person of ordinary skill in the art.

SUMMARY

The present invention provides a parts arrangement structure of a fuel cell electric vehicle (FCEV), which is capable of securing the ability to be assembled to thus be advantageously applied to mass production and other types of vehicles, securing ability to maintain parts which require relatively frequent maintenance, securing performance of parts of which performance varies according to installation positions of the parts, and achieving an increase of an impact absorption space through an optimal arrangement of the parts by modularizing and efficiently disposing main parts of a fuel cell system, a driver motor, a decelerator, and some of electric parts of the FCEV.

More particularly, the present invention provides a parts arrangement structure capable of securing the ability to be assembled to be advantageously applied to mass production and other types of vehicles through a single modularization of a fuel cell stack and a drive motor, securing cooling performance by optimizing an arrangement and a configuration of cooling parts, improving the ability to maintain an air conditioner compressor, improving noise, vibration, and harshness (NVH) performance by attaching a water pump to a drive device, achieving an increase of an impact absorption space through an optimal arrangement of parts, and securing impact performance and reducing material costs through installation of an inverter at an upper end of the driver motor by efficiently optimally disposing parts, such as a fuel cell stack, a thermal management system (TMS), a hydrogen supply device (FPS), an air humidifier, an air blower, the drive motor, decelerator, an inverter, an electrical junction box, an air conditioner compressor for an air conditioning device, and the water pump for electric parts, in an engine room in which main parts of an FCEV.

In one aspect, the present invention provides a parts arrangement structure of a fuel cell electric vehicle, in which a fuel cell stack, a thermal management device for a fuel cell stack, a hydrogen supply device for a fuel cell stack, and an electrical junction box may be installed at an upper end of a system frame installed within an engine compartment, and a drive device, an air a humidifier for a fuel cell stack, and an air blower for a fuel cell stack may be installed at a lower end of the system frame and may be modularized, and a water pump for electric parts may be installed at a front end of the drive device, and an air conditioner compressor may be installed at one side of the drive device, such that the drive device and the air conditioner compressor are disposed in a left-right (e.g., width) direction.

In an exemplary embodiment, the drive device may include a drive motor using the fuel cell stack as a power source, and a decelerator coupled to the drive motor and disposed together with the drive motor in the left-right direction, and an inverter configured to operate the drive motor may be installed at an outer side of the drive motor. The drive motor may be disposed behind the air humidifier and the decelerator may be disposed to extend in a front-rear (e.g., lengthwise) direction at one side of the drive motor to be connected to a drive shaft, and the drive shaft may be disposed to extend in the left-right direction at a rear side of the drive motor and may be connected to the decelerator to receive power of the drive motor through the decelerator.

In another exemplary embodiment, the water pump for electric parts may be installed at a front end of the decelerator, and the air conditioner compressor may be installed at one side of the decelerator. The air conditioner compressor may be disposed at a side opposite the drive motor coupled to the decelerator and, simultaneously, may be disposed behind the air blower. In addition, the air humidifier may be disposed in front of the drive device, and the air humidifier and the air blower may be disposed in the left-right direction.

Further, a composite cooling module may be disposed in front of the system frame. A cooling water outlet of a radiator for electric parts of the composite cooling module (i.e., a radiator for electric parts included in the composite cooling module) may be connected to a cooling water inlet of the water pump for electric parts, and the cooling water outlet may be disposed to be higher than the cooling water inlet. The electrical junction box may be disposed at the upper end of the fuel cell stack, and a blower pump control unit (BPCU) may be separated from the electrical junction box and installed at a vehicle body within the engine compartment. A cooling water outlet of the BPCU may be connected to the cooling water inlet of the radiator for electric parts, and the cooling water outlet may be disposed to be lower than the cooling water inlet.

A side mounting member coupled to the vehicle body may be installed at both left and right sides of the system frame, and a rear mounting member coupled to the a front subframe of suspension may be installed at a rear end of the drive device. In addition, the thermal management device for a fuel cell stack may be installed at the upper side of the system frame when disposed at a left side or a right side of the fuel cell stack, and the hydrogen supply device for a fuel cell stack may be disposed at a side opposite the thermal management device for a fuel cell stack.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

A fuel cell system of a fuel cell electric vehicle (FCEV) generates electric power using a fuel cell stack and allows a driver motor to drive the FCEV using the electric power generated by the fuel cell stack. The fuel cell system includes various parts such as a hydrogen supply device (fuel process system (FPS)), an air process system (APS), a thermal management system (TMS), and the like to drive the fuel cell stack.

The hydrogen supply device (FPS) may be configured to adjust a supply of hydrogen (fuel) to the fuel cell stack, the APS may be configured to adjust a supply of air to the fuel cell stack, and the TMS may be configured to adjust the heat and water of the fuel cell stack. The APS may include an air blower configured to supply air to the fuel cell stack with a substantially constant pressure, an air humidifier configured to humidify the air supplied to the fuel cell stack, and an air cleaner configured to remove foreign materials from the air supplied to the fuel cell stack, and the TMS may include a water pump for a fuel cell stack configured to supply the fuel cell stack with cooling water to cool the fuel cell stack.

When some parts of the fuel cell system, an electromechanical drive device (e-drive), and some of vehicle electric parts (e.g., electric parts for cooling) are installed at the FCEV, the fuel cell stack, the TMS, the APS, and an electrical junction box, which form the fuel cell system, are conventionally installed at a module frame and are assembled with a vehicle body (at three places) as a single module, and the electromechanical drive device is installed at the front sub-frame of suspension (at three places) as another single module. Therefore, the two single modules are respectively assembled and installed at the vehicle body and the front sub-frame, and thus, the number of assembly processes increases, separate equipment for decking of the electromechanical drive device is required, and the ability to assemble is degraded.

Further, since the TMS is conventionally disposed at a side surface (particularly, a right side) of the fuel cell stack, a width between side members (e.g., a portion of the vehicle body), which are disposed at both sides of a vehicle engine compartment, is restricted, and thus the water pump for a fuel cell stack among the parts of the TMS is separately disposed under the module frame, thus causing a disadvantage in maintenance of the water pump for a fuel cell stack. Since the air conditioner compressor installed at the module frame is conventionally obscured by the drive motor and the air humidifier which are disposed below the air conditioner compressor, when the air conditioner compressor is serviced, detachment of the air humidifier and a cooling module disposed in front thereof is required, resulting in a disadvantage in maintenance of the air conditioner compressor.

Conventionally, the inverter (or referred to as a "motor controller") configured to operate the drive motor is not modularized with the drive motor, thereby being separately installed (disposed at a lower end of an air cleaner), and thus a high-voltage cable and a cooling circuit (cooling hose) is required to be separately connected between the drive motor and the inverter according to a distance therebetween, thus increasing the number of assembly processes and decreasing the ability to be assembled (e.g., decreased the ease of assembly).

Further, the electromechanical drive device to which an I-shaped decelerator is applied is conventionally installed behind the air humidifier, and in this case, to prevent interference with a steering gear box disposed behind the drive motor of the electromechanical drive device, the decelerator is disposed at a front side, thus increasing in a bent angle of a drive shaft which is connected to the decelerator to receive power of the drive motor. The drive shaft transmits rotational power of the drive motor to a wheel, and when the bent angle increases, driving stability is degraded.

Additionally, since the water pump for electrical parts is conventionally installed outside vehicle body parts (particularly, side members) disposed at both left and right sides of the vehicle engine compartment, vibration of the water pump for electric parts may be introduced into a vehicle interior along the vehicle body and thus, NVH performance of the FCEV is disadvantageously degraded. Additionally, the water pump for electric parts is installed separate from the module frame having the fuel cell stack, thereby increasing the number of assembly processes.

As described above, main parts constituting the fuel cell system, the electromechanical drive device (e-drive), and some of vehicle electric parts are conventionally installed a limited space of the FCEV (e.g., the engine compartment), causing a disadvantage in ease of assembly, ability to be maintain, and performance secureness of the parts according to installation positions of the parts and an arrangement state between the parts.

Accordingly, in the present invention, the main parts of the fuel cell system installed at the FCEV, the electromechanical drive device, and some of the vehicle electric parts (e.g., the water pump for electric parts, the air conditioner compressor, and the like) may be efficiently disposed and modularized as a single module to thus improve the ease of assembly of a vehicle manufacturing line to allow the parts to be advantageously applied to mass production and other types of vehicles, improve the ability to maintain parts requiring relatively frequent maintenance, performance of vehicle parts varied according to installation positions, and an increase in impact absorption space may be achieved through an optimal arrangement of the parts.

Specifically, in the present invention, the drive device (e-drive) for an FCEV operation and the fuel cell system for providing a power source for an operation of the drive device (e-drive) may be modularized into a single module, thereby securing the ease of assembly in the vehicle manufacturing line to facilitate mass production, the water pump for electric parts may be modularized and assembled with the fuel cell system and the drive device (e-drive), thereby improving NVH performance of the FCEV and reducing the number of assembly processes in the vehicle manufacturing line.

In particular, the air conditioner compressor may be disposed at either left or right side of the decelerator of the drive device (e-drive), to secure the ability to maintain (e.g., provide maintenance to) the air conditioner compressor. The TMS as well as the water pump for a fuel cell stack, which is one of parts of the TMS, may be disposed at either left or right side (e.g., at a left side or a right side) of the fuel cell stack, thereby securing the ability to maintain the water pump for a fuel cell stack and facilitating a connection to the radiator for electric parts disposed at a front side of the FCEV. The inverter may be installed at an upper end of the drive motor of the drive device (e-drive), thereby reducing the number of assembly processes in the vehicle manufacturing line.

Additionally, a high-voltage cable and the cooling circuit (cooling water hose) connected between the inverter and the electrical junction box may be removed, thereby reducing the number of assembly processes and material costs. The L-shaped decelerator may be used to prevent interference between the L-shaped decelerator and parts (steering gear box) disposed behind the L-shaped decelerator and the L-shaped decelerator may be disposed at a position that improves the bent angle of the drive shaft. The radiator for electric parts and a capacitor may be disposed in parallel in left and right directions, thereby increasing an arrangement space of the radiator for electric parts. A composite parallel cooling module increased in size of the radiator for a fuel cell stack may be applied, thereby improving cooling performance with respect to the vehicle electric parts and the fuel cell stack.

Accordingly, in the present invention, when the main parts of the fuel cell system, the electromechanical drive device (e-drive), and some of the electric parts for cooling may be installed and arranged at the FCEV, the respective parts may be efficiently arranged to be packaged and configured as a single module capable of being installed in a limited space (engine room) of the FCEV. Further, in the present invention, the electric parts for cooling, such as the water pump for electrical parts and the air conditioner compressor, may be integrally modularized and configured with the fuel cell system, to reduce the cooling circuit of the FCEV through which cooling water for cooling the fuel cell stack and the electric parts flows.

Hereinafter, the present invention will be described with reference to FIGS. 1 to 10 to allow those skilled in the art to practice the present invention. It is noted that front, rear, left, right, upper, and lower directions are based on front, rear, left, right, upper, and lower directions of the FCEV. The FCEV may include a space for installing main parts of the fuel cell system configured to generate electric power using the fuel cell stack and for installing main parts, such as an electromechanical drive device 28, configured to generate a driving force for an FCEV operation, and the space may be referred to as an engine compartment 1 (see FIG. 6).

Figure 6:
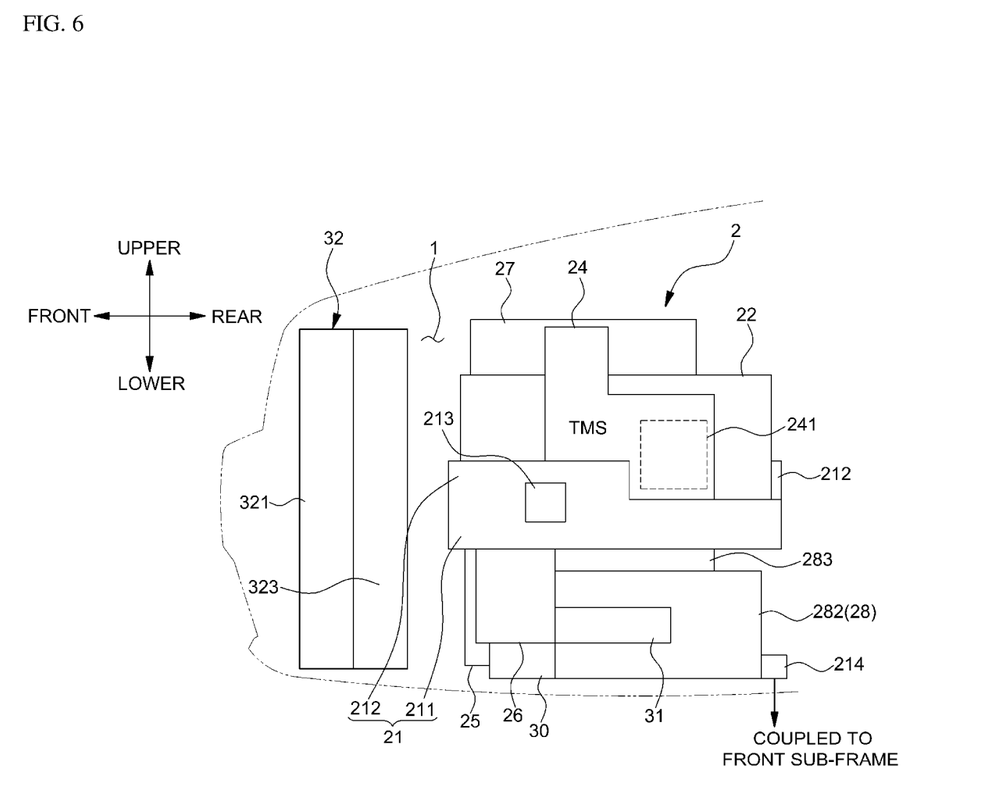
FIG. 6 is a side view illustrating powertrain fuel cell module of the present invention disposed within an engine compartment according to an exemplary embodiment of the present disclosure.

The engine compartment 1 is a limited space surrounded by a vehicle body panel (particularly, a hood) disposed at an upper end of the engine compartment 1, a vehicle body panel (particularly, an under cover) disposed at a lower end of the engine compartment 1, a vehicle body panel (particularly, a dashboard) disposed at a rear end of the engine compartment 1, and vehicle body panels disposed at a front end and left and right sides of the engine compartment 1.

As shown in FIGS. 1 to 6, according to the present invention, among parts disposed within the engine compartment 1, a fuel cell stack 22, a hydrogen supply device (FPS) 23 for a fuel cell stack, a TMS 24 for a fuel cell stack, an electrical junction box 27, an air humidifier 25 for a fuel cell stack, an air blower 26 for a fuel cell stack, the electromechanical drive device (e-drive) 28, an inverter 283, a water pump 30 for electric parts, and an air conditioner compressor 31 for an air conditioning device may be installed at a the system frame 21 and may be configured as a single module. The single module is a power supply device of the FCEV and may be referred to as a powertrain fuel cell (PFC) module 2 or a powertrain fuel cell module 2.

The system frame 21 may be fixed to a vehicle body inside the engine compartment 1 in a state in which parts of the PFC module 2 are installed at the system frame 21. Accordingly, a side mounting member 213 configured to be coupled to the vehicle body may be installed at both left and right sides of the system frame 21. Further, among the parts installed at the system frame 21, the drive device 28 may be fixed to the front sub-frame, and accordingly, a rear mounting member 214 coupled to the front sub-frame may be installed at a rear end of the drive device 28. The PFC module 2 may thus be fixed to the vehicle body by the side mounting member 213 and to the front sub-frame by the rear mounting member 214, and two places of the PFC module 2 may be supported and fixed to the vehicle body and one place of the PFC module 2 may be supported and fixed to the front sub-frame. The side mounting member 213 may be installed at a side member of the vehicle body, and the rear mounting member 214 may be installed at the front sub-frame of the suspension of FCEV. The front sub-frame may be disposed behind the PFC module 2.

The system frame 21 may include a horizontal frame 211 formed to extend in a width direction of the FCEV and a vertical frame 212 that extends upward or vertically from both left and right ends of the horizontal frame 211, and may secure collision performance of the FCEV to minimize a vertical length of the vertical frame 212 to a predetermined distance (e.g., about 200 mm) or more between the system frame 21 and an electric brake booster disposed behind of the TMS 24. A fracture structure may be applied to a compressor bypass valve (CBV) of the TMS 24 facing the electric brake booster.

Particularly, the parts of the fuel cell system such as the fuel cell stack 22, the hydrogen supply device (FPS) 23 for a fuel cell stack, and the TMS 24 for a fuel cell stack, and the high-voltage electrical junction box 27 disposed at an upper end of the fuel cell stack 22 may be installed at an upper end of the system frame 21. Further, the parts of the fuel cell system such as the air humidifier 25 for a fuel cell stack and the air blower 26 for a fuel cell stack, the parts for cooling the FCEV such as the water pump 30 for electric parts, and the air conditioner compressor 31, and the drive device 28 configured to generate a driving force using electric power of the fuel cell stack 22 may be installed at a lower end of the system frame 21.

The TMS 24 may be configured to perform heat and water management and may include a COD heater, a CBV, a cooling water temperature control valve, and a water pump 241 for a fuel cell stack. The water pump 241 for a fuel cell stack may be disposed at the upper end of the system frame 21 to be positioned proximate to other components of the TMS 24, and thus a differential head through which cooling water flows may be reduced and flow resistance may be minimized, such that cooling water in the fuel cell stack 22 may be efficiently supplied to the TMS 24, and also maintenance of the water pump 241 for a fuel cell stack may be improved compared with a related art.

The drive device 28 may include a drive motor 281 configured to generate driving power using electricity generated by the fuel cell stack 22, and a decelerator 282 coupled to either left or right side (e.g., a right side) of the drive motor 281, and the inverter 283 (or referred to as a "motor controller") configured to operate the drive motor 281 may be installed at an outer side of the drive motor 281. In particular, the inverter 283 may be disposed at an upper end of the drive motor 281 and at this point, the inverter 283 may be disposed between the system frame 21 and the drive motor 281.

When the inverter 283 is installed at the outer side of the drive motor 281, the inverter 283 and the drive motor 281 may be connected through a single parts such as a three-phase bus bar by removing a high-voltage cable that connects the inverter 283 and the drive motor 281. Additionally, also a cooling hose that cools the inverter 283 may be removed and a cooling circuit of the drive motor 281 may be commonly used with the inverter 283. Further, an arrangement direction of a high-voltage connector provided at the inverter 283 and connected to the electrical junction box 27 may be set to secure a rolling gap with a body member (side member).

The drive motor 281 may be installed and disposed at the lower end of the system frame 21 to extend from a rear side of the air humidifier 25 in the left-right direction of the FCEV. The decelerator 282 may be disposed at the lower end of the system frame 21 while connected to a drive motor 281 and may be configured to transfer power. An L-shaped decelerator formed in an L-shaped structure may be applied as the decelerator 282, and for example, the decelerator 282 may be formed in an L-shaped structure that extends from a right side of the drive motor 281 in a front-rear direction of the FCEV and that extends from a rear side of the drive motor 281 in the width direction of the FCEV.

The decelerator 282 may be formed in the L-shaped structure and thus a length (size) in the front-rear direction may be reduced. Accordingly, the decelerator 282 may be disposed at a relatively rear side within a possible range without considering interference with a steering gear box disposed behind the PFC module 2, and thus, a bent angle of a drive shaft 29 coupled to the decelerator 282 may be reduced and improved. Further, the decelerator 282 may be formed in the L-shaped structure, and thus a width of a portion of the decelerator 282 disposed at a side of the drive motor 281 may be reduced, and thus, a space in which the air conditioner compressor 31 may be installed is provided at the lower end of the system frame 21.

The air conditioner compressor 31 may be configured to compress a refrigerant of an air cooling device for the FCEV (e.g., air conditioner of an air conditioning system for the FCEV) and may be installed at either left or right side of the decelerator 282 to be disposed at a side opposite the drive motor 281 coupled to the decelerator 282. When the under cover of the engine room 1 is opened, the air conditioner compressor 31 is immediately visible, and thus, maintenance of the air conditioner compressor 31 may be provided more easily (e.g., ability to maintain is improved).

The drive shaft 29 may be disposed behind the drive motor 281 and the air conditioner compressor 31 to extend in the left-right direction of the FCEV. An equal-length drive shaft may be applied to the drive shaft 29. The equal-length drive shaft may include a left drive shaft, a right drive shaft, and an intermediate shaft connected between the left drive shaft and the right drive shaft and may be configured to transfer power. The decelerator 282 may be connected to the drive shaft 29 and may be configured to transfer rotational power of the drive motor 281 to the drive shaft 29. The drive shaft 29 may be connected to a wheel and may be configured to transfer the power to the wheel.

Figure 5:
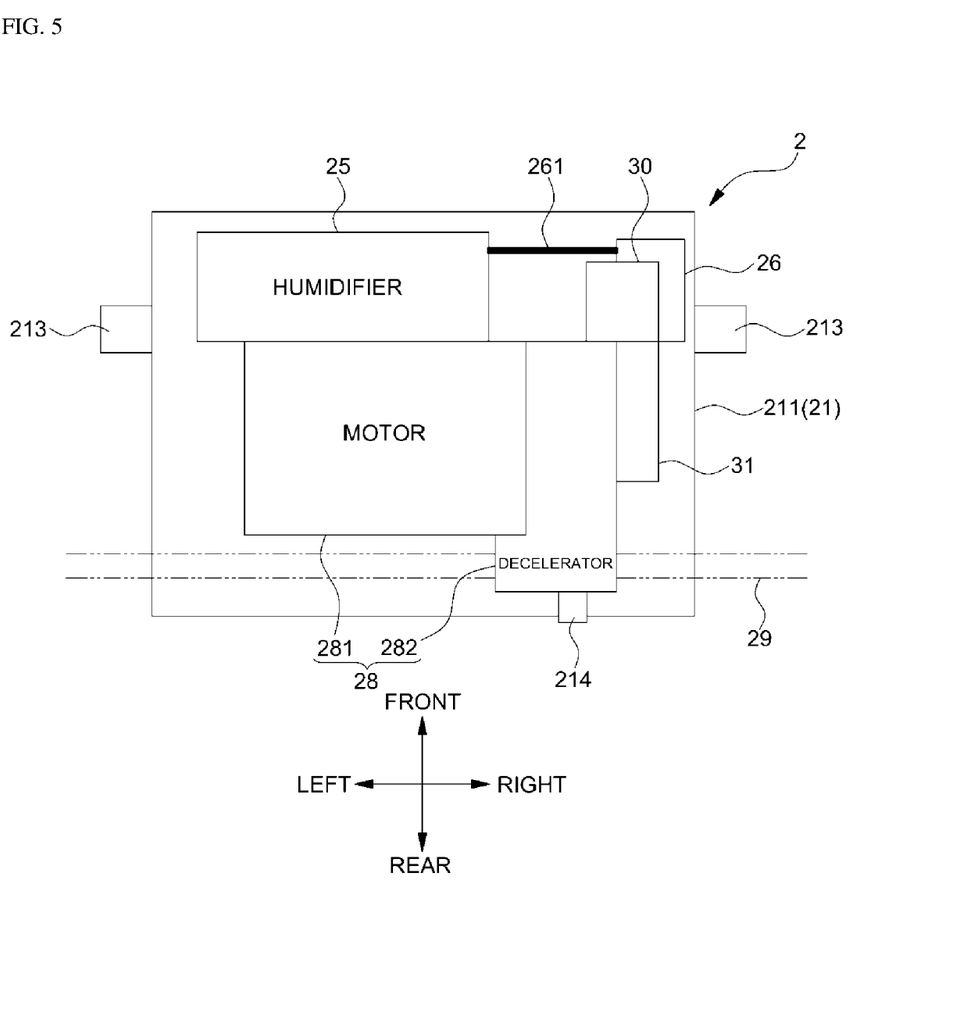
FIG. 5 is a bottom view illustrating the parts arrangement structure of the FCEV according to an exemplary embodiment of the present invention.

As shown in FIG. 5, the air conditioner compressor 31 may be disposed at either left or right side of the decelerator 282 to be disposed at a side opposite the drive motor 281 coupled to the decelerator 282, and at the same time, the air conditioner compressor 31 may be disposed between the air blower 26 and the drive shaft 29 at a rear side of the air blower 26. The air blower 26 may be disposed in parallel with the air humidifier 25 at a front side of the drive device 28. The air humidifier 25 may be disposed proximate to the air blower 26 since the air humidifier 25 may be configured to humidify air supplied to the fuel cell stack 22. In addition, the air humidifier 25 and the air blower 26 may be disposed in a line (in the width direction) for an arrangement of the air hose 261 for air flow between the air humidifier 25 and the air blower 26. The air hose 261 may be disposed to extend in the width direction when installed between the air humidifier 25 and the air blower 26.

Further, the water pump 30 for electric parts may be disposed at either left or right side of the air humidifier 25, and, the water pump 30 for electric parts may be installed at a front end of the decelerator 282 disposed between the drive motor 281 and the air conditioner compressor 31. For example, the water pump 30 may be disposed in front of the decelerator 282 at the right side of the air humidifier 25. The air humidifier 25 may be disposed to extend to be long (e.g., lengthwise) in the width direction of the FCEV. The air blower 26 may be disposed to be long (e.g., to extend lengthwise) in the length direction of the FCEV. The water pump 30 may be disposed to be relatively biased to either left or right side (e.g., a right side) from a center of the system frame 21.

Additionally, the water pump 30 may be disposed in consideration of a position of the water pump 241 for a fuel cell stack. For example, when the water pump 241 for a fuel cell stack is disposed at a right side of the fuel cell stack 22, the water pump 30 for electric parts may be disposed at the right side based on the center of the system frame 21 (see FIG. 1). In other words, the water pump 30 for electric parts may be disposed and positioned below the water pump 241 for a fuel cell stack by interposing the system frame 21 between the water pump 30 for electric parts and the water pump 241 for a fuel cell stack.

The water pump 30 for electric parts may be configured to supply cooling water to the cooling circuit to cool the electrical parts of the FCEV at a predetermined pressure and may be installed at the front end of the decelerator 282 of the powertrain fuel cell module 2 and may be modularized with the fuel cell stack 22. Thus, the number of assembly processes may be reduced in the vehicle manufacturing line, and also it may be possible to reduce an inflow of vibration due to driving of the water pump 30 for electric parts into the vehicle along with the vehicle body, thus improving the NVH performance of the FCEV.

Further, a composite cooling module 32 may be disposed in front of the water pump 30 for electric parts, the air humidifier 25, and the air blower 26. In other words, the composite cooling module 32 may be disposed in front of the powertrain fuel cell module 2. A cooling water outlet 321b of a radiator 321 for electrical parts of the composite cooling module 32 may be disposed upward to be higher than a cooling water inlet 301 of the water pump 30 for electric parts by being spaced by a predetermined interval (e.g., about 50 mm) (See FIG. 8). In other words, the cooling water outlet 321b may be located at a higher position than the cooling water inlet 301/

Figure 8:
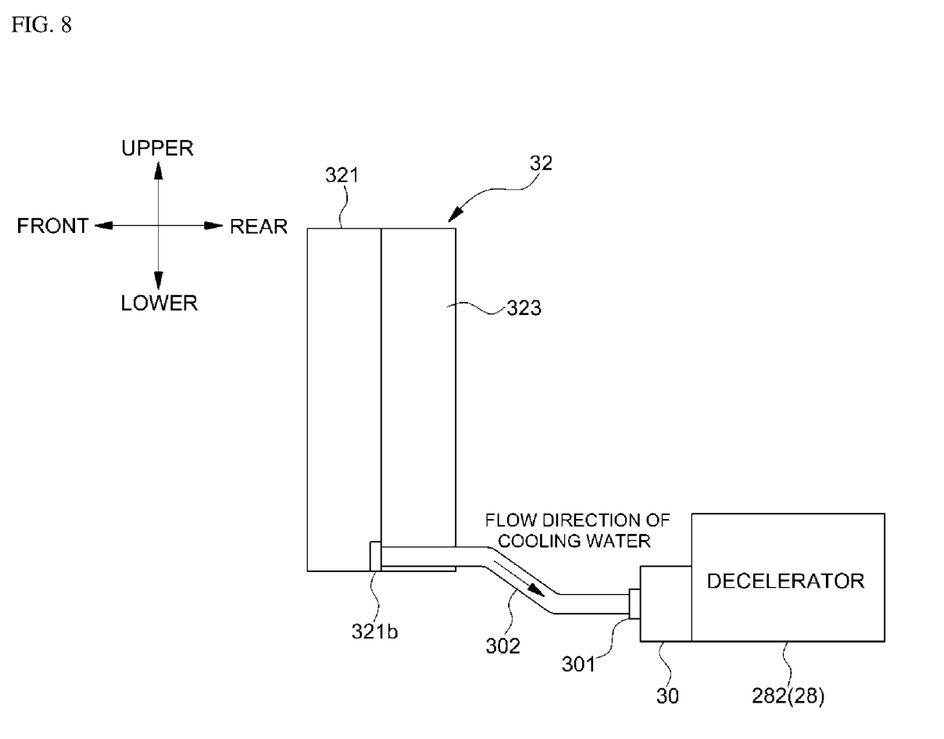
FIG. 8 is a diagram illustrating an arrangement state between a cooling water outlet of a radiator for electric parts and a cooling water inlet of a water pump for electric parts according to an exemplary embodiment of the present invention.

A hose 302 for a flow of cooling water that flows from the cooling water outlet 321b to the cooling water inlet 301 may be connected between the cooling water outlet 321b and the cooling water inlet 301. In other words, the cooling water inlet 301 of the water pump 30 for electric parts may be disposed to be lower than the cooling water outlet 321b of the radiator 321 for electric parts based on a vertical direction of the FCEV. The cooling water inlet 301 may be located at a position that is lower than that of the cooling water outlet 321b. Accordingly, the flow and circulation performance of the cooling water flowing from the radiator 321 for electric parts to the water pump 30 for electric parts may be improved, and thus, cooling performance with respect to the electric parts of the FCEV may be improved.

Figure 7:
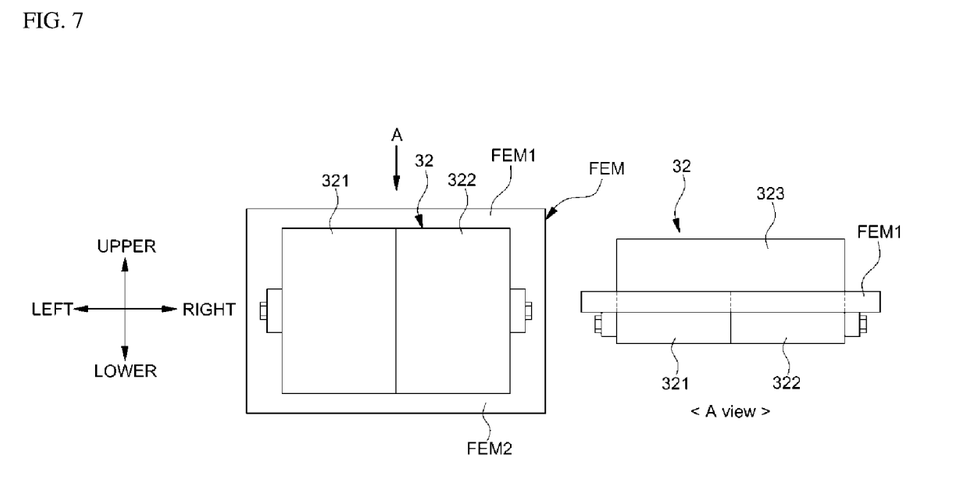
FIG. 7 is a diagram illustrating a state in which a composite cooling module of the present invention is installed at a vehicle body according to an exemplary embodiment of the present disclosure.

The composite cooling module 32 may include a cooling module for electric parts, which is configured with the radiator 321 for electric parts and a condenser 322 disposed in parallel in the width direction or in the vertical direction in front of the PFC module 2, and a radiator 323 for a fuel cell stack disposed in parallel behind the cooling module for electric parts (see FIGS. 6 and 7). In other words, the composite cooling module 32 may be configured by integrally modularizing the radiator 321 for electric parts, the condenser 322, and the radiator 323 for a fuel cell stack. Particularly, the condenser 322 may be configured to cool the refrigerant for air conditioning and the radiator 321 may be configured to cool the cooling water for the electric parts and the radiator 323 may be configured to cool the cooling water for a fuel stack. The radiator 323 for a fuel cell stack may be increased in size by being disposed in parallel at a rear end of the cooling module for electric parts, and thus cooling performance with respect to the fuel cell stack 22 may be improved, such that a maximum driving speed of the FCEV may be increased.

The composite cooling module 32 may be coupled and fixed to the vehicle body in the engine compartment 1, and the radiator 323 for a fuel cell stack may be disposed in front of the PFC module 2 and the system frame 21 (particularly, in front of the fuel cell stack 22, the air humidifier 25, and the air blower 26). Accordingly, the composite cooling module 32 may be disposed in front of the PFC module 2 to allow a gap having a predetermined interval (e.g., about 29 mm) to be formed between the fuel cell stack 22 and the composite cooling module 32 of the PFC module 2 in the length direction. Accordingly, a front over hang (FOH) from a distal front end of a front bumper of the FCEV to a center of a front wheel of the FCEV may be optimized.

Further, the composite cooling module 32 may be installed at a front end module FEM disposed at a foremost position among the vehicle body members constituting the vehicle body (see FIG. 7), and the composite cooling module 32 may be coupled to the front end module FEM by applying a side mounting method. Accordingly, cross sections of an upper member FEM1 and a lower member FEM2 of the front end module FEM may be minimized to secure an appropriate gap between the upper member FEM1 and the vehicle body hood.

Figure 9:
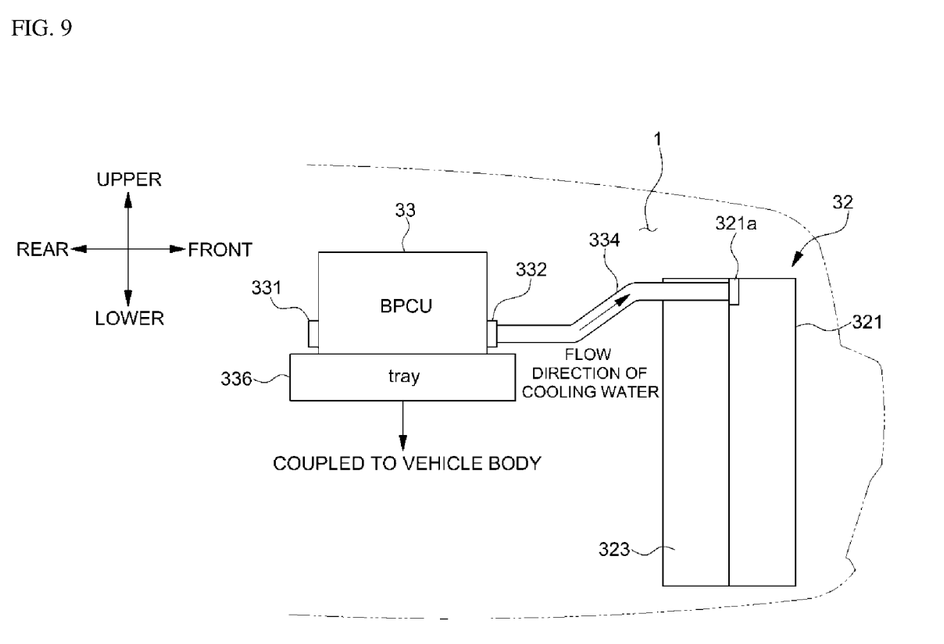
FIG. 9 is a diagram illustrating an arrangement state between a cooling water outlet of a blower pump control unit (BPCU) and a cooling water inlet of a radiator for electric parts according to an exemplary embodiment of the present invention.

Furthermore, in the present invention, an atmospheric open type electric parts cooling system using the composite cooling module 32 is applied, and at the same time, a blow pump control unit (BPCU) 33 configured to operate the air blower 26 may be separately installed at the vehicle body by being separated from the high-voltage electrical junction box 27 disposed at the upper end of the fuel cell stack 22 (see FIG. 9). The BPCU 33 may be installed at the vehicle body in the engine compartment 1, and for example, a separate tray 336 may be disposed at an upper end of a mounting portion (e.g., side mounting member) of the PFC module 2 mounted on a left (or right) portion of the vehicle body and then the BPCU 33 may be installed at the tray 336.

As shown in FIG. 9, a cooling water outlet 332 for discharging the cooling water that flows in the BPCU 33 to cool the BPCU 33 may be disposed to be lower than a cooling water inlet 321*a* for an inflow of the cooling water of the radiator 321 for electric parts by a predetermined height. The cooling water that cools the electric parts of the FCEV may be forcibly circulated into the cooling circuit between the electric parts through the water pump 30 for electric parts. When positions of an inlet and an outlet for the cooling water of the electric parts requiring cooling are to be higher than the cooling water inlet 321*a* of the radiator 321 for electric parts, the cooling circuit may be filled with air thus degrading a vacuum setting of the cooling circuit and a cooling water injection into the cooling circuit.

Therefore, the BPCU 33 may be disposed separately by being separated from the electrical junction box 27, and the cooling water outlet 332 of the BPCU 33 may be disposed to be lower than the cooling water inlet 321*a* of the radiator 321 for electric parts by a predetermined height. Accordingly, the vacuum setting of the cooling circuit formed among the electric parts and the cooling water injection to the cooling circuit may be improved. A cooling water inlet 331 of the BPCU 33 may be disposed to be lower than the cooling water inlet 321*a* of the radiator 321 for electric parts by a predetermined height.

Particularly, the cooling water that flows in the cooling circuit for cooling the electric parts of the FCEV may be cooled by air in the composite cooling module 32. Then, the cooling water may be circulated along a path as follows of the composite cooling module 32→the water pump 30 for electric parts→the air blower 26→the drive motor 281→the air humidifier 25→the BPCU 33→the composite cooling module 32. The cooling water outlet 332 of the BPCU 33 and the cooling water inlet 321*a* of the radiator 321 for electric parts may be connected to a hose 334 to allow the cooling water to flow from the cooling water outlet 332 to the cooling water inlet 321*a*. The electrical junction box 27 from which the BPCU 33 has been separated may be reduced in vertical height and front-rear length compared with the related art, and thus, the electrical junction box 27 may be disposed at a relatively front side on the upper end of the fuel cell stack 22.

In other words, the electrical junction box 27 may be disposed at the front side of the upper end of the fuel cell stack 22, to form a gap greater than a reference value between the electrical junction box 27 and the vehicle body hood. Additionally, a vertical gap that prevents interference and collision between a high-voltage connector provided at a rear end of the electrical junction box 27 and the vehicle body panel (particularly, a cowl panel at an upper side of the dash panel) at an upper side of a rear end of the engine room 1 may be increased, to thus secure pedestrian head foam (crash space). The electrical junction box 27 is an electric wiring device configured to distribute and supply the electric power generated by the fuel cell stack 22 to the drive motor 281 and the electric parts of the FCEV.

Meanwhile, when the air blower 26 for a fuel cell stack is installed at the lower end of the system frame 21, a connector of the air blower 26, which is configured to allow electricity to enter and exit, may be disposed to face the outside of the PFC module 2, and in this case, the wiring of the connector may be simplified. Through the arrangement of the parts as described above, a clearance space may be secured in front of the engine compartment 1, and thus, a buffer structure 34 capable of alleviating an impact when the FCEV collides may be installed in the clearance space. When the fuel cell stack 22 is installed in the engine compartment 1 provided at the front side of the FCEV, to protect driver and passenger inside vehicle by preventing the vehicle dash panel from being torn, the buffer structure 34 may be installed to secure collision performance of the FCEV.

Figure 10:
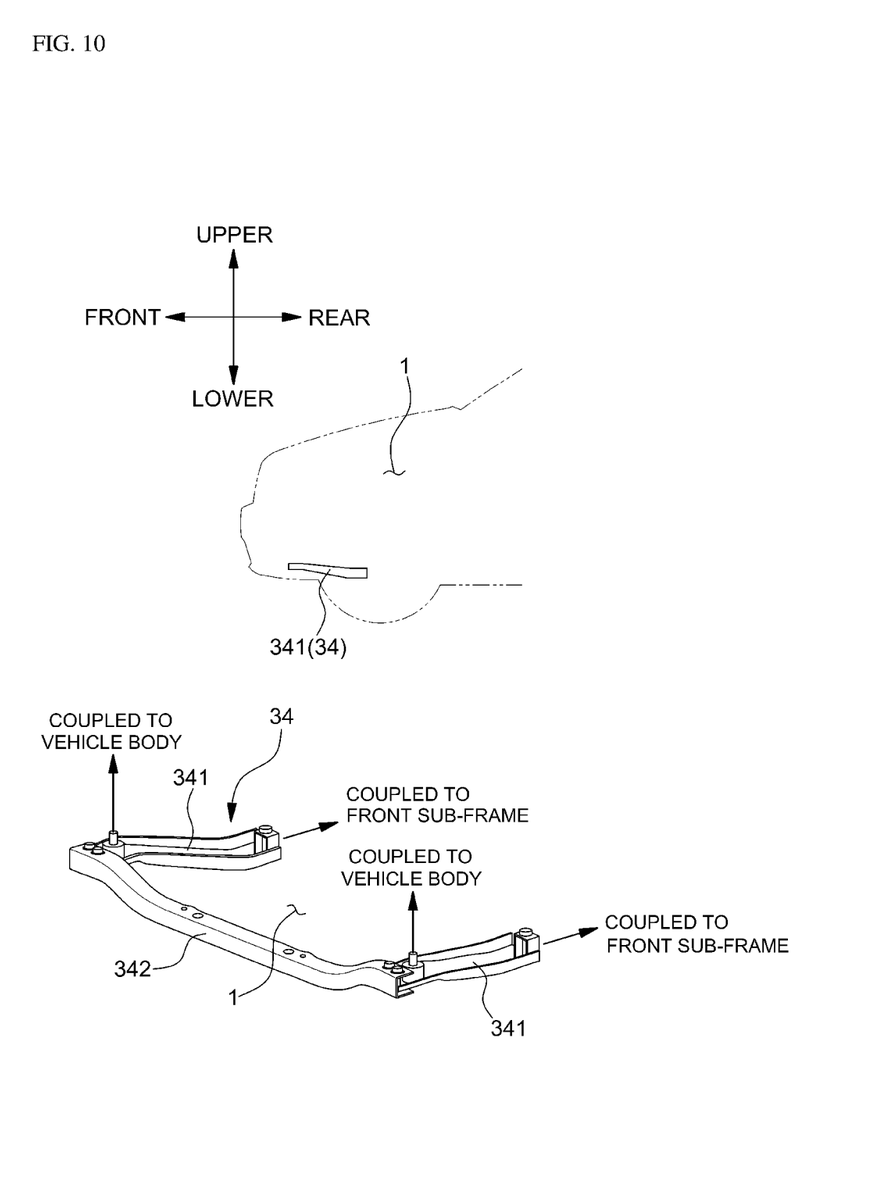
FIG. 10 is a diagram illustrating a buffer structure according to an exemplary embodiment of the present invention.

As shown in FIG. 10, the buffer structure 34 may include a horizontal member 342 that extends in a lateral direction (e.g., the left-right or width direction) in front of the engine room 1, and a vertical member 341 that extends in a longitudinal direction (e.g., the front-rear or length direction) at both left and right sides of the engine room 1. The buffer structure 34 may be assembled with members of the vehicle body and the front sub-frame disposed in front of the engine compartment 1 and at both of the left and right sides of the engine compartment 1 and may be disposed at the front side and the both sides of the engine room 1.

Further, the TMS 24 for a fuel cell stack may be installed at the upper side of the system frame 21 while disposed at the left side or the right side of the fuel cell stack 22, and the hydrogen supply device (FPS) 23 for a fuel cell stack may be disposed at a side opposite to the TMS 24. Although not shown in detail, the hydrogen supply device (FPS) 23 may include a fuel hose or the like for supplying hydrogen to the fuel cell stack 22.

Figure 1:
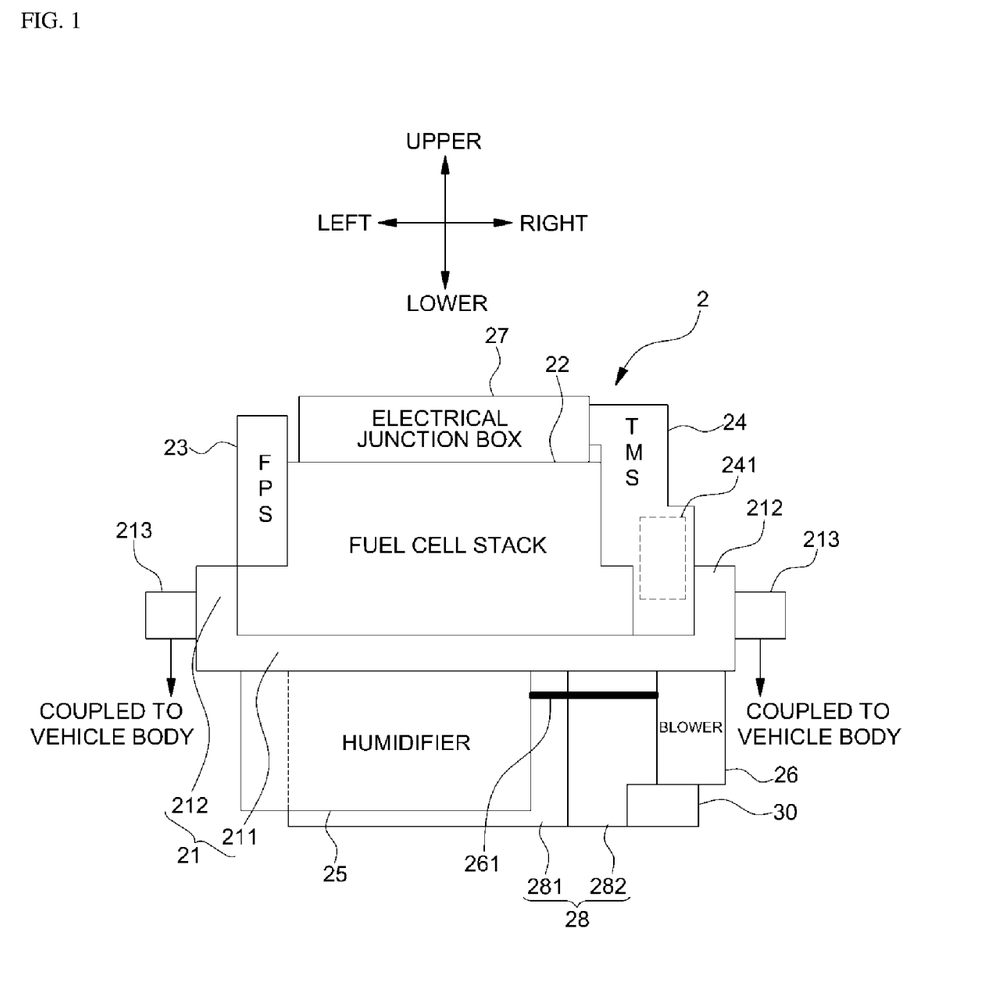
FIG. 1 is a front view illustrating a parts arrangement structure of a fuel cell electric vehicle (FCEV) according to an exemplary embodiment of the present invention.
Figure 2:
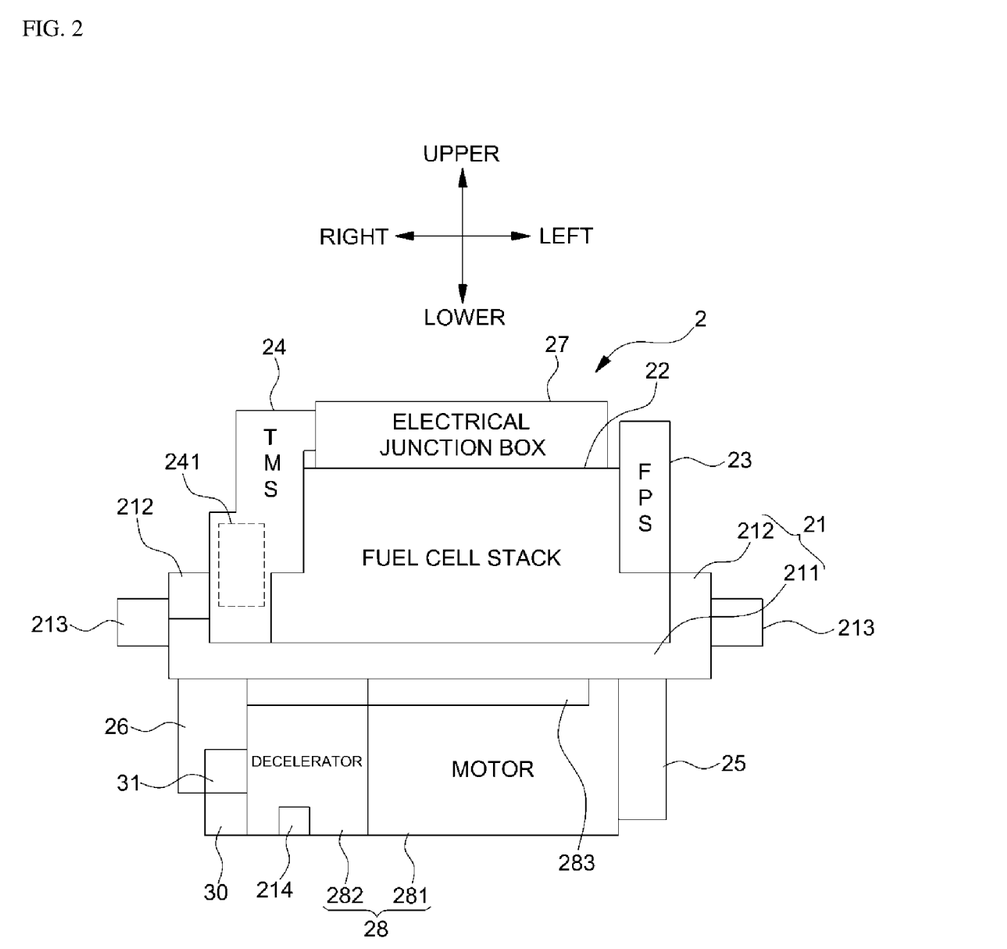
FIG. 2 is a rear view illustrating the parts arrangement structure of the FCEV according to an exemplary embodiment of the present invention.
Figure 3:
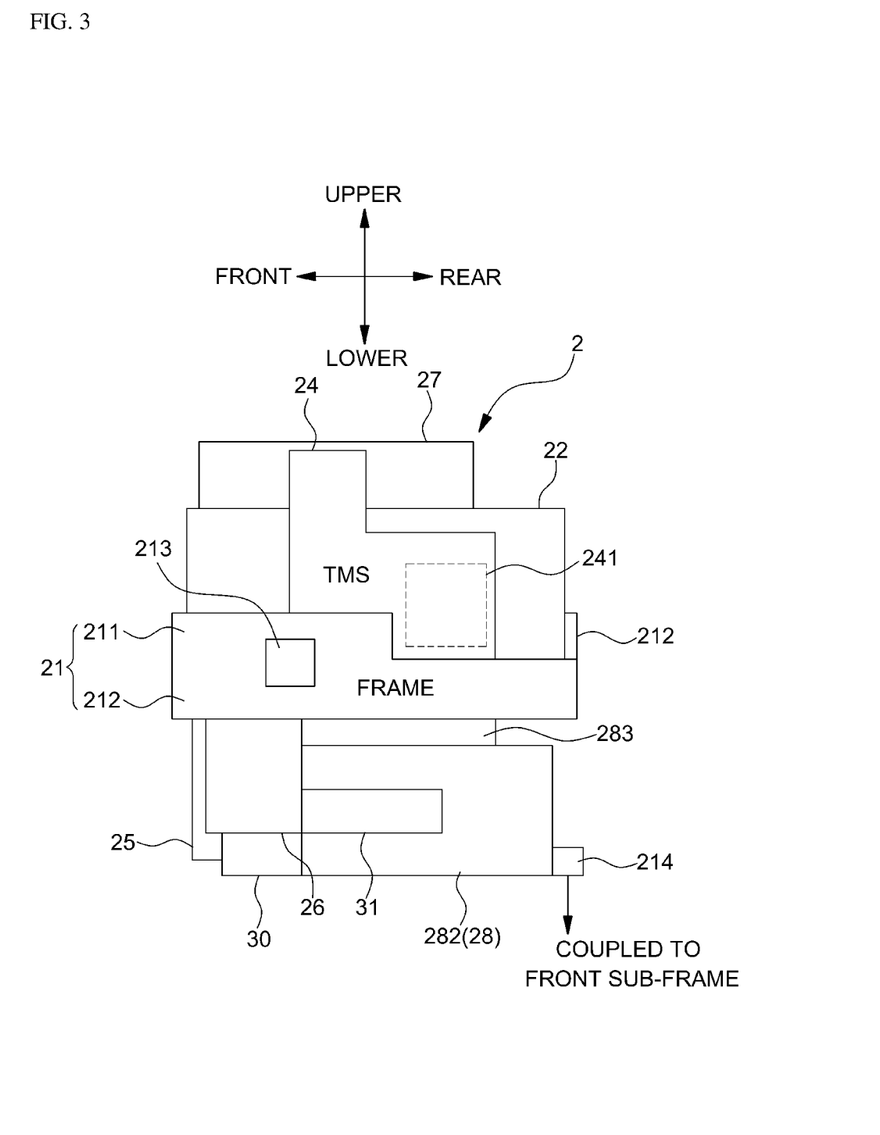
FIG. 3 is a right side view illustrating the parts arrangement structure of the FCEV according to an exemplary embodiment of the present invention.
Figure 4:
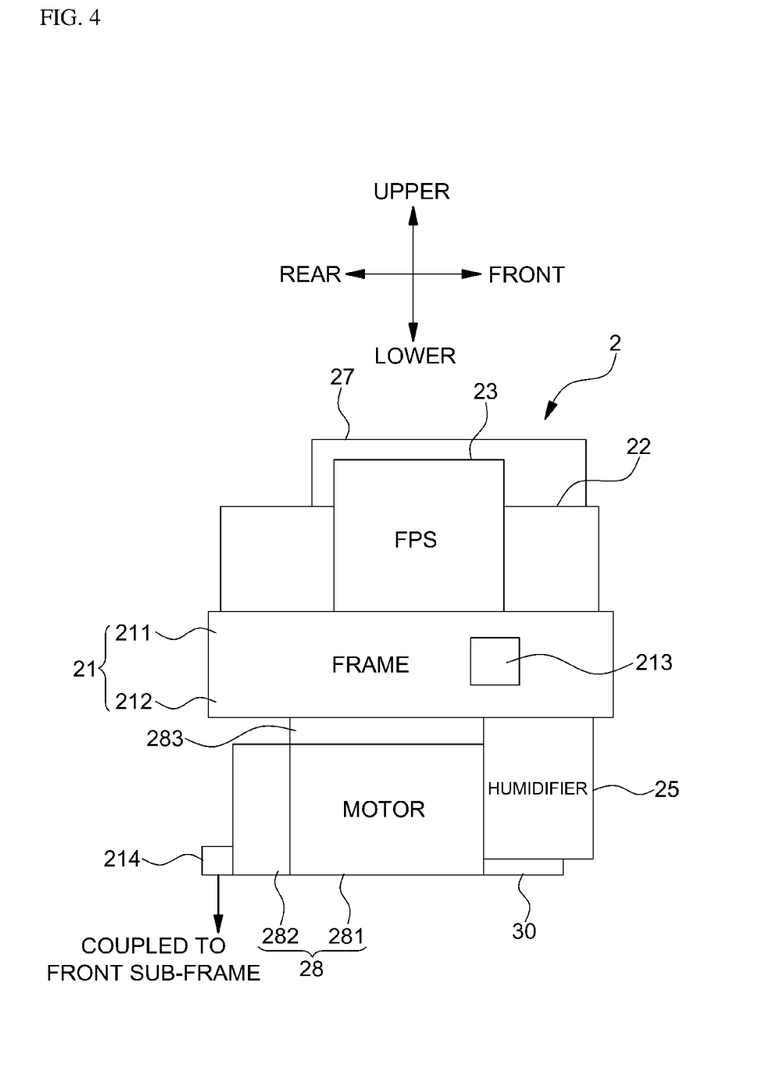
FIG. 4 is a left side view illustrating the parts arrangement structure of the FCEV according to the present invention.

As shown in FIGS. 1 and 2, the hydrogen supply device (FPS) 23 may be installed at the upper end of the system frame 21 via the fuel cell stack 22. For example, the hydrogen supply device (FPS) 23 may be installed in a state of being disposed at the upper end of the left side of the fuel cell stack 22. A space for connecting and attaching the hydrogen supply device (FPS) 23 may be provided at the upper end of the left side of the fuel cell stack 22. The above-described electrical junction box 27 may be also installed at the upper end of the system frame 21 via the fuel cell stack 22.

In accordance with the parts arrangement structure of the FCEV according to the present invention, the main parts of the fuel cell system installed at the FCEV, the drive device for an FCEV operation, and some of electric parts of the FCEV (the water pump for electric parts, the air conditioner compressor, and the like) may be efficiently disposed and assembled by being modularized as a single module. Accordingly, the ease of assembly in the vehicle manufacturing line may be improved to be advantageously applied to mass production and other types of vehicles. Additionally, there are advantages in which maintenance of parts requiring frequent maintenance, such as the air conditioner compressor and the like, may be secured and an increase of an impact absorption space may be achieved through an optimal arrangement of the parts. Further, in accordance with the present invention, the electric parts for cooling (cooling system parts), such as the water pump for electric parts, and the air conditioner compressor are modularized with the fuel cell system, such that there is an advantage in which a length of the cooling circuit for cooling the parts of the FCEV may be shortened.

Although the exemplary embodiments of the present invention have been described in detail, the scope of the prevent invention is not limited to these exemplary embodiments, and various modifications and improvements devised by those skilled in the art using the fundamental concept of the present invention, which is defined by the appended claims, further fall within the scope of the present invention. The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A parts arrangement structure of a fuel cell electric vehicle, comprising:
    a fuel cell stack, a thermal management device for the fuel cell stack, a hydrogen supply device for the fuel cell stack, and an electrical junction box installed at an upper end of a system frame installed in an engine compartment;
    a drive device, an air humidifier for the fuel cell stack, and an air blower for the fuel cell stack installed at a lower end of the system frame and modularized;
    a water pump for electric parts installed at a front end of the drive device; and
    an air conditioner compressor installed at one side of the drive device, to dispose the drive device and the air conditioner compressor in a width direction of the vehicle.

2. The parts arrangement structure of claim 1, wherein the drive device includes a drive motor using the fuel cell stack as a power source, and a decelerator coupled to the drive motor and disposed together with the drive motor in the width direction, and an inverter configured to operate the drive motor is installed at an outer side of the drive motor.

3. The parts arrangement structure of claim 2, wherein the drive motor is disposed behind the air humidifier and the decelerator is disposed at one side of the drive motor to be connected to a drive shaft, and the drive shaft is disposed to extend in the width direction at a rear side of the drive motor and is connected to the decelerator to receive power of the drive motor through the decelerator.

4. The parts arrangement structure of claim 2, wherein the water pump for electric parts is installed at a front end of the decelerator.

5. The parts arrangement structure of claim 2, wherein the air conditioner compressor is installed at one side of the decelerator, and the air conditioner compressor is disposed at a side opposite the drive motor coupled to the decelerator and, simultaneously, is disposed behind the air blower.

6. The parts arrangement structure of claim 1, wherein the air humidifier is disposed in front of the drive device, and the air humidifier and the air blower are disposed in the width direction.

7. The parts arrangement structure of claim 1, wherein a composite cooling module is disposed in front of the system frame, a cooling water outlet of a radiator for electric parts of the composite cooling module is connected to a cooling water inlet of the water pump for electric parts, and the cooling water outlet is disposed to be higher than the cooling water inlet.

8. The parts arrangement structure of claim 7, wherein the electrical junction box is disposed at the upper end of the fuel cell stack, and a blower pump control unit (BPCU) is separated from the electrical junction box and is installed at a vehicle body within the engine compartment.

9. The parts arrangement structure of claim 8, wherein a cooling water outlet of the BPCU is connected to the cooling water inlet of the radiator for electric parts, and the cooling water outlet is disposed to be lower than the cooling water inlet.

10. The parts arrangement structure of claim 1, wherein a side mounting member coupled to the vehicle body is installed at both left and right sides of the system frame, and a rear mounting member coupled to a front sub-frame of suspension is installed at a rear end of the drive device.

11. The parts arrangement structure of claim 1, wherein the thermal management device for a fuel cell stack is installed at the upper side of the system frame in a state of being disposed at a left side or a right side of the fuel cell stack, and the hydrogen supply device for a fuel cell stack is disposed at a side opposite the thermal management device for a fuel cell stack.

* * * * *